US 6,727,009 B2

(12) United States Patent
Masaki et al.

(10) Patent No.: US 6,727,009 B2
(45) Date of Patent: Apr. 27, 2004

(54) MAGNETIC RECORDING MEDIUM COMPRISING A MAGNETIC LAYER EXHIBITING LOW ΔM VALUE

(75) Inventors: Kouichi Masaki, Kanagawa (JP); Toshiyuki Suzuki, Fukuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/940,527

(22) Filed: Aug. 29, 2001

(65) Prior Publication Data
US 2002/0045067 A1 Apr. 18, 2002

(30) Foreign Application Priority Data
Aug. 31, 2000 (JP) .................. P.2000-264048

(51) Int. Cl.$^7$ ................................. B32B 5/16
(52) U.S. Cl. .............................. 428/694 BH
(58) Field of Search ...................... 428/694 BH

(56) References Cited

U.S. PATENT DOCUMENTS

| 5,455,093 A | * | 10/1995 | Kawamata et al. |
| 5,601,916 A | * | 2/1997 | Yamazaki et al. |
| 5,693,397 A | * | 12/1997 | Saito et al. |
| 6,096,406 A | * | 8/2000 | Yamazaki et al. |
| 6,132,635 A | * | 10/2000 | Taguchi et al. |

* cited by examiner

Primary Examiner—H. Thi Le
(74) Attorney, Agent, or Firm—Sughrue Mion, PLLC

(57) ABSTRACT

A magnetic recording medium comprises a non-magnetic layer containing a non-magnetic powder abd a binder provided on a support, and a magnetic layer containing a ferromagnetic powder and a binder provided on the non-magnetic layer, wherein the magnetic layer contains a hexagonal ferrite magnetic powder having an average tabular diameter of 10 to 28 nm and has a coercive force (Hc) of 135 to 400 kA/m, a ratio (Hc/Hk) of the Hc to an anisotropic magnetic field (Hk) of 0.3 to 0.6, and a maximum value of ΔM of 0 to 0.10.

10 Claims, 1 Drawing Sheet

MAGNETIC RECORDING MEDIUM COMPRISING A MAGNETIC LAYER EXHIBITING LOW ΔM VALUE

FIELD OF THE INVENTION

The present invention relates to a magnetic recording medium such as a magnetic tape, particularly, it relates to a magnetic recording medium with a magnetic layer formed by applying on a support a magnetic coating mainly containing a ferromagnetic powder and a binder. More specifically, it relates to a magnetic recording medium for high density recording, including a hexagonal ferrite dispersed in a binder in a magnetic layer, particularly preferable for use in a system using an MR head (magnetoresistive head) in reproduction.

BACKGROUND OF THE INVENTION

Conventionally, as a magnetic recording medium such as a video tape, an audio tape, and a magnetic disc, those having a magnetic layer provided by coating on a support a ferromagnetic iron oxide, a Co modified ferromagnetic iron oxide, a $CrO_2$, a ferromagnetic metal powder, a hexagonal ferrite, or the like dispersed in a binder are widely used. It is known that the hexagonal ferrite has the excellent high density recording characteristics among these examples as described, for example, JP-A-60-157719, JP-A-62-109226, and JP-A-3-280215(the term "JP-A" as used herein means "unexamined published Japanese patent application"). JP-A-5-12650 discloses a method for improving the surface property, the short wavelength output, the erasure characteristic and the durability by adjusting a thickness of a magnetic layer containing the ferrite to 0.1 to 0.6 μm and providing a non-magnetic layer thickener than the magnetic layer between the magnetic layer and a support. JP-A-5-225547 discloses a magnetic recording medium having a non-magnetic layer on a support and forming a 0.1 μm or less thick magnetic layer containing a magnetic powder, which is excellent in high frequency characteristic, signal rewriting characteristic, and durability.

Moreover, JP-A-3-286420, IEEE. Trans. Mag, vol. 24, No. 6, Nov. 1988, p. 2850, or the like disclose the influence of the anisotropic magnetic field Hk of a hexagonal ferrite on the electromagnetic characteristics of a magnetic recording medium. Moreover, the former discloses a magnetic recording medium comprising two magnetic layers provided on a non-magnetic layer, wherein the lower magnetic layer has an axis of easy magnetization in the longitudinal direction, and the upper magnetic layer contains a magnetic powder having the anisotropic magnetic field of 3,000 Oe or less for providing a magnetic recording medium capable of providing a high output in a wide range from a long wavelength to a short wavelength. JP-A-8-115518 proposes a medium for high density recording having an Hc of 103.5 to 298 kA/m, an Hc/Hk of 0.30 to 1.0, and a squareness ratio SQ in the in-plane direction of 0.65 to 1.00. It is characterized by specifying each numerical range of the Hc, Hc/HK, and SQ in the in-plane direction of a magnetic layer containing a hexagonal ferrite powder. Thereby, the ultra short wavelength output necessary for high density recording is improved dramatically. However, since it has a high noise in the case of use by an MR head, it is not preferable.

Recently, a highly sensitive reproduction head (MR head) utilizing the magnetoresistance is used for a data recording system for computers, and the system noise depends on noise derived from the magnetic recording medium. Okabe, et al. suggests that use of a Ba ferrite medium in combination with an MR head is preferable since it can avoid saturation of the MR head (IEEE. Trans. Mag., Vol. 32(5), p. 3404–3406 (1996)). Development of finer ferromagnetic particles is promoted for reducing the medium noise. However, it is presumed that the stability of the magnetization transitional area becomes the issue to be tackled due to influence of the thermal fluctuation as the reduction of ferromagnetic particle size. The magnetization stability is evaluated by a formula of KuV/kT (wherein Ku represents a magnetic anisotropic constant, V represents a particle volume, k represents a Boltzmann constant, and T represents an absolute temperature). Concerning the particle volume and the thermal fluctuation of the metal tapes, there is a report by Toshiyuki Suzuki, et al. (Shingakugihou, MR97-55, P. 33–40, Nov. 21, 1997).

Since the hexagonal ferrite has a saturated magnetization of about $\frac{1}{3}$ to $\frac{1}{2}$ with respect to that of the ferromagnetic metal powder, it is difficult to make Ku large, and thus the thermal fluctuation is large. Furthermore, a magnetic recording medium using a hexagonal ferrite is said to have a large interaction between the particles so as to influence the medium noise level. Although the excellent magnetization stability is said to be provided owing to a large interaction between the particles, when particle is inverted magnetically for some reasons, magnetic substances in the vicinity may also be magnetically inverted. Therefore, a problem is involved in that it is difficult to sufficiently ensure the C/N in the case of reproducing with an MR head a medium for high density recording produced using a hexagonal ferrite magnetic powder with a minute particle size.

SUMMARY OF THE INVENTION

In order to solve the problems of the conventional techniques, the present invention is made paying attention to the inter-particle interaction of a magnetic recording medium using a fine hexagonal ferrite. Specifically, an object of the invention is to provide a magnetic recording medium having a magnetization stability superior to that of the conventional products, and good short wavelength output and C/N at the time of reproduction using an MR head.

The object of the invention is attained by a magnetic recording medium comprising a non-magnetic layer containing an inorganic non-magnetic powder dispersed in a binder provided on a support, and a magnetic layer containing a ferromagnetic powder dispersed in a binder provided on the non-magnetic layer, wherein the magnetic layer contains a hexagonal ferrite magnetic powder having an average tabular diameter of 10 to 28 nm and has a coercive force (Hc) of 135 to 400 kA/m, a ratio (Hc/Hk) of the Hc to an anisotropic magnetic field (Hk)of 0.3 to 0.6 and a maximum value of ΔM of 0 to 0.10.

Moreover, according to the invention, it is preferable that the magnetic layer thickness is 0.01 to 0.5 μm, and the residual magnetic flux density×magnetic layer thickness is 5 to 100 mT·μm.

DETAILED DESCRIPTION OF THE INVENTION

Figure 1:
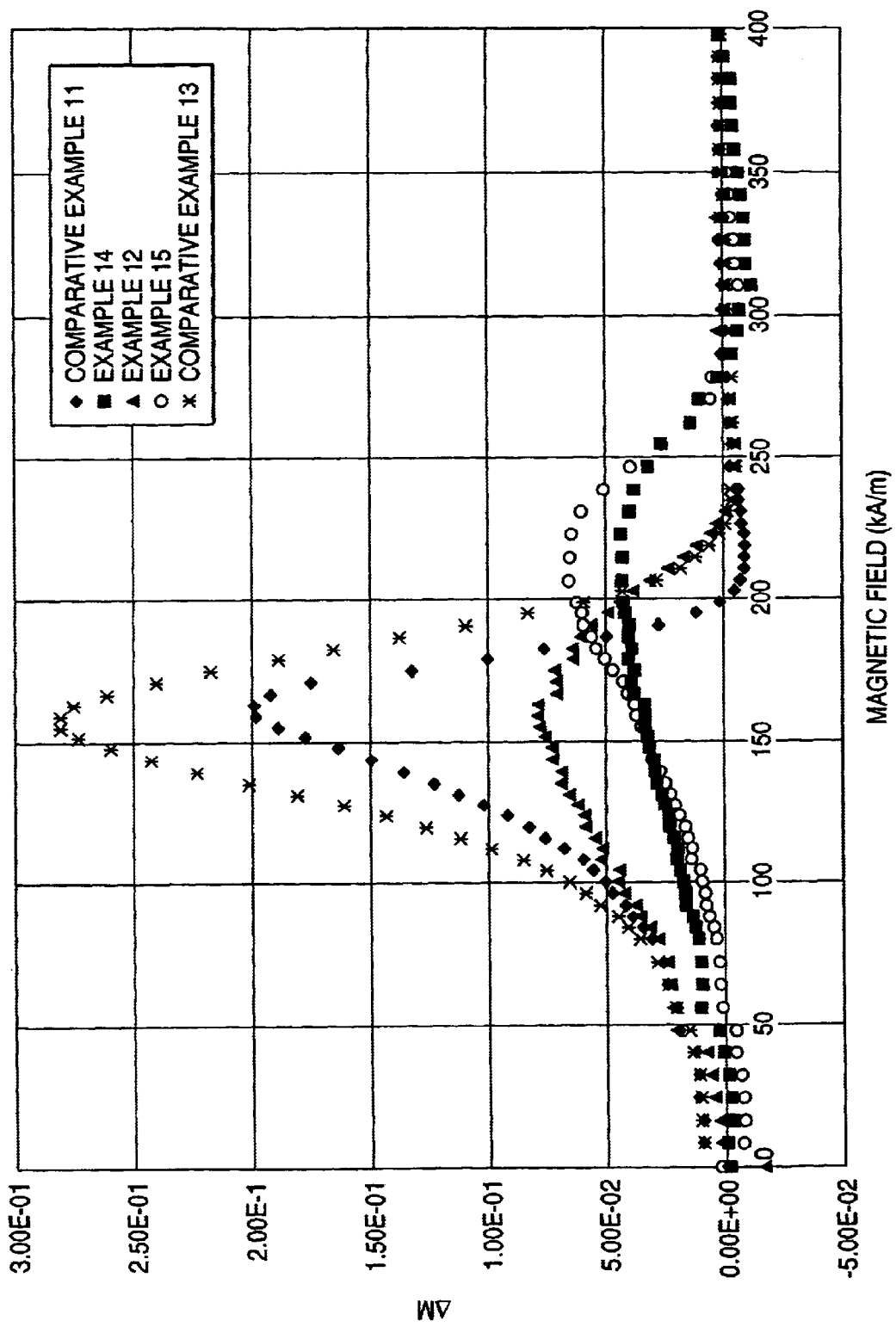
FIG. 1 is a graph showing the magnetic characteristics of the magnetic recording media of the invention and for comparison wherein the vertical axis denotes ΔM and the lateral axis denotes the magnetic field strength (KA/m). The term "E-01" in the vertical axis represents "×10$^{-1}$", and the same is applied to the numerals. The maximum value at the plus side of the ΔM curve is defined as ΔMmax.

According to the invention, numerical value ranges of the particle size of the hexagonal ferrite magnetic powder, and the Hc, the Hc/Hk and the maximum value of ΔM of the magnetic layer containing the same are specified respectively. Thereby, the ultra short wavelength output necessary for high density recording and the magnetization stability are improved dramatically.

The rotational hysteresis loss Wr value was measured from a low magnetic field to 800 kA/m. It was plotted with respect to the inverse number of the applied magnetic field. The magnetic field whereat the Wr is 0 on the high application magnetic field side was found by extrapolating the straight line portion of the Wr curve was obtained and indicated as the Hk.

By controlling the composition and the shape (tabular thickness and tabular ratio) of the hexagonal ferrite, the Hk can be enlarged. Since a large Hk provides a larger Ku, it is preferable for achieving the object of the invention of improving the magnetization thermal stability. For the invention, the Hk is preferably 390 to 800 kA/m.

Setting of the Hc largely depends on the performance of the head to be used for recording. In the case of a head using a highly saturated magnetic flux (Bs) material such as an Fe—Ta—N, the Hc is preferably 135 kA/m or more. The upper limit of the Hc cannot be generally defined since it depends on the head material, however, in the case the magnetic layer is thin, a recording operation is considered to be executed to the magnetic recording medium having the Hc of about 400 kA/m Hc. On the other hand, when the Hc is less than 135 kA/m, a high recording density cannot be achieved.

Therefore, the Hc is controlled in a range of 135 to 400 kA/m, preferably 150 to 350 kA/m. Moreover, the Hc/Hk is controlled in a range of 0.3 to 0.6, preferably 0.35 to 0.6.

Furthermore, in the invention, the maximum value of ΔM is controlled in a range of 0 to 0.10, preferably 0 to 0.09.

In order to have the maximum value of ΔM in a range of 0 to 0.10, it is effective to prevent stacking of particles, reduce the filling degree of the magnetic substance, and not to have the squareness ratio higher than the necessary level. From the viewpoint of the particle size and shape, it is preferable to have an average tabular diameter of 10 to 28 nm, and a small tabular ratio (average tabular diameter/average tabular thickness) for reducing the generation of stacking and achieving the object of the invention. The average tabular diameter is preferably 15 to 25 nm, and the tabular ratio is preferably in a range of 1.5 to 4.0, more preferably 2 to 3.8.

It is preferable to increase a binder resin amount (including curing agent) than usual for reducing the interaction between the particles. It is preferable to use 200 to 800 parts by weight, further preferably 250 to 700 parts by weight of a magnetic substance with respect to 100 parts by weight of a binder resin.

On the other hand, in the case wherein the average tabular diameter of the magnetic substance exceeds 28 nm, the interaction between the particles is large so that it is difficult for the maximum value of ΔM to have 0.10 or less. Also, a high noise is provided, and the magnetization attenuation is large, and thus it is not preferable.

ΔM is calculated at each measured magnetic field by the formula ΔM=Id(H)−((1−2Ir(H)) based on the isothermal remanence curve Ir(H) measured after AC demagnetization, and the remanence curve Id(H) measured after DC demagnetization (e.g., *IEEE, Trans. Magnetics,* P. I. Mayo et al., 26, p.1894 (1990).

In order to prevent deterioration of the reproduction output according to saturation of the MR head, the residual magnetic flux density (Br)×magnetic layer thickness (δ) is preferably 5 to 100 mT·μm. A value more than 100 mT·μm is not preferable since the MR head saturation can easily be generated. The residual magnetic flux density is preferably in a range of 70 to 200 mT, more preferably 70 to 180 mT. Moreover, the magnetic layer thickness is preferably in a range of 0.01 to 0.5 μm, more preferably 0.02 to 0.1 μm.

The magnetization attenuation gradient (ΔS) is preferably in a range of 0 to 0.05, more preferably 0 to 0.045.

ΔS can be obtained by applying the same magnetic field as that of a tape Hc in the opposite direction after the DC saturation magnetization, measuring the magnetization attenuation for 1,000 seconds, finding the magnetization attenuation gradient (S) to lnt (t: time in second) for 10 to 1,000 seconds, and standardizing the gradient (S) by the residual magnetization Mr.

The fluctuation field (Hf) is preferably in a range of 0 to 2.0 kA/m, more preferably 0 to 1.8 kA/m. A small Hf is preferable since it can be stable with respect to the thermal fluctuation.

The fluctuation field (Hf) can be calculated by finding the irreversible susceptibility χirre (the numerical value of the difference of residual magnetization in the vicinity of the Hc is used) from the remanence curve, and using the formula Hf=S/χirre.

The activated volume Va can be calculated by the formula Va=kT/(Ms·Hf). In the formula, k is Boltzmann constant, T is absolute temperature, and Ms is saturated magnetization per volume.

Moreover, the square ratio (SQ) of magnetic layer is preferably in a range of 0.50 to 0.65, more preferably 0.55 to 0.64.

Hereinafter, the hexagonal ferrite magnetic powder to be used for the magnetic layer (also referred to as the upper layer) will be explained. Examples of the hexagonal ferrite magnetic powder contained in the upper layer of the invention include a bariumferrite, a strontium ferrite, a lead ferrite, a calcium ferrite, and a Co substituted substance thereof. Specifically, magnetoplumbite type barium ferrite and strontium ferrite, and further, magnetoplumbite type barium ferrite and strontium ferrite partially containing a spinel phase are illustrated. Moreover, in addition to the predetermined atoms, other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb maybe contained as well, In general, those having elements such as Co—Ti, Co—Ti—Zr, Co—Nb, Co—Ti—Zn, Co—Zn—Nb, Ni—Ti—Zn, Nb—Zn, Ni—Ti, and Zn—Ti added can be used. The SFD in the upper layer longitudinal direction is preferably 0.3 or less since distribution of the coercive force can be small. From the viewpoint of the SFD, a pure magnetoplumbite type ferrite is preferable compared with a composite type ferrite containing a large amount of a spinel layer. In order to control the coercive force, a method of controlling the composition, the particle size, and the particle thickness, a method of controlling the thickness of the spinel phase of the hexagonal ferrite, a method of controlling the amount of the substituted element in the hexagonal ferrite, a method of controlling position of the substituted site in the hexagonal ferrite, or the like can be adopted.

The hexagonal ferrite magnetic powder used in the invention is ordinarily a hexagonal tabular powder. The size thereof is measured as follows.

In the specification, the size of various kinds of powders such as the hexagonal ferrite magnetic powder (hereinafter referred to as the "powder size") is measured by a high resolution transmission type electron microscope photograph. That is, the powder size is represented by (1) the length of the major axis comprising the powder, that is, the major axis length in the case the powder shape is needle-like, spindle-like, columnar (in the case the height is larger than the bottom surface maximum major axis), or the like. It is represented by (2) the maximum major axis of the plate surface or the bottom surface in the case the powder shape is tabular or columnar (in the case the thickness or the height is smaller than the maximum major axis of the plate surface or the bottom surface). It is represented by (3) the diameter corresponding to the circle in the case the powder shape is spherical, polyhedron, unspecified, or the like as well as the major axis comprising the powder cannot be specified by the shape. The diameter corresponding to the circle is obtained by the circle projection method.

Moreover, the average powder size of the powder is the arithmetic average of the powder size, which is found by the above-mentioned measurement for about 500 pieces of primary particles. The primary particles represent individual powders without aggregation.

Furthermore, the average needle-like ratio of the powder is obtained by measuring the minor axis length of the powder in the above-mentioned measurement, that is, the minor axis length, and calculating the arithmetic average of the (major axis length/minor axis length) values of each powder. Herein, the minor axis length represents the length of the minor axis comprising the powder in the case of (1) of the above-mentioned powder size definition. It represents the thickness or the height in the case of (2). The (major axis length/minor axis length) is regarded as 1 for convenience in the case of (3) since there is no distinction between the major axis and the minor axis.

In the case the powder shape is specified, for example, in the case of the powder size definition (1), the average powder size is referred to as the average major axis length. In the case of the definition (2), the average powder size is referred to as the average tabular diameter, and the arithmetic average of the (maximum major diameter/thickness or height) is referred to as the average tabular ratio. In the case of the definition (3), the average powder size is referred to as the average particle size.

In the invention, the average tabular diameter of the hexagonal ferrite magnetic powder is in a range of 10 to 28 nm, preferably 15 to 25 nm. Moreover, the average thickness of the magnetic powder is ordinarily 2 to 15 nm, preferably 4 to 7 nm. Furthermore, the average tabular ratio is preferably 1.5 to 4, more preferably 2 to 3.8. In the case the average tabular diameter is less than 10 nm, it provides a high specific surface area so that the dispersion is difficult, and thus it is not preferable. Moreover, the specific surface area ($S_{BET}$) of the hexagonal ferrite magnetic powder by the BET method is ordinarily 25 to 100 $m^2/g$, preferably 40 to 80 $m^2/g$. In the case it is less than 25 $m^2/g$, noise becomes higher, while in the case it is more than 100 $m^2/g$, the dispersion is difficult so that the surface smoothness can hardly be obtained, and thus neither of the cases is preferable. The water content is preferably 0.3 to 2.0%. It is preferable to optimize the water content of magnetic powder depending on the kind of the binder. It is preferable to optimize the pH of magnetic powder depending on the combination with the binder to be used. The range thereof is 4 to 12, preferably 6 to 10. A surface treatment may be applied to the magnetic powder, if desired, by Al, Si, P, Zr, Mg, an oxide thereof or a hydroxide thereof. A preferable surface treatment is executed with $Al_2O_3.nH_2O$ or $SiO_2.nH_2O$. It is preferable to change the amount and the ratio thereof depending on the binder to be used. The amount thereof is 0.1 to 10% by weight with respect to the magnetic powder. Application of the surface treatment is preferable since an adsorption amount of lubricating agent such as a fatty acid can controlled to 100 $mg/m^2$ or less. The magnetic powder may contain soluble inorganic ions such as Na, Ca, Fe, Ni, or Sr. Although it is preferred that the total amount thereof is small, the characteristics of magnetic powder are adversely influenced, when the amount is 100 ppm or less. The σs value is 35 $A.m^2/kg$ or more, preferably 40 $A.m^2/kg$ or more. The tap density is preferably 0.5 g/ml or more, more preferably 0.8 g/ml or more. Production methods of the hexagonal ferrite magnetic powder include a glass crystallization method, a co-precipitation method, and a hydrothermal reaction method. In the invention, the method is not particularly limited, but the glass crystallization method is preferable since a fine particle with a good particle distribution can be obtained.

As the binder resin of the magnetic layer in the magnetic recording medium of the invention, conventionally known thermoplastic resins, thermosetting resins, reactive type resins, and mixtures thereof can be used. As the thermoplastic resins, those having a glass transition temperature of −100 to 150° C., a number average molecular weight of 1,000 to 200,000, preferably 10,000 to 100,000 and a polymerization degree of about 50 to about 1,000 can be used.

As the binder resins, a polymer or a copolymer containing vinyl chloride, vinyl acetate, vinyl alcohol, maleic acid, acrylic acid, an acrylate, vinylidene chloride, acrylonitrile, methacrylic acid, a methacrylate, styrene, butadiene, ethylene, vinyl butylal, vinyl acetal, vinyl ether, or the like as a component unit, a polyurethane resin, and various kinds of rubber based resins can be used.

Moreover, as the thermosetting resins and the reactive type resins, a phenol resin, an epoxy resin, a polyurethane curing type resin, a urea resin, a melamine resin, an alkyd resin, an acrylic reactive resin, a formaldehyde resin, a silicone resin, an epoxy-polyamide resin, a mixture of a polyester resin and an isocyanate prepolymer, a mixture of a polyester polyol and a polyisocyanate, a mixture of a polyurethane and a polyisocyanate, or the like can be used.

In order to enhance dispersion effect of the ferromagnetic powder and durability of the magnetic layer, it is preferable to use a binder resin having at least one polar group selected from the member consisting of COOM, $SO_3M$, $OSO_3M$, $P=O(OM)_2$, $O—P=O(OM)_2$, (M represents a hydrogen atom, or an alkali metal salt group), OH, $NR_2$, $N^+R_3$ (R represents a hydrocarbon group), an epoxy group, SH, and CN introduced by copolymerization or addition reaction, if desired. The amount of the polar group is $10^{-1}$ to $10^{-8}$ mole/g, preferably $10^{-2}$ to $10^{-6}$ mole/g.

The binder resin to be used in the magnetic recording medium of the invention is used in a range of 5 to 50% by weight, preferably 10 to 30% by weight based on the ferromagnetic powder. It is preferable to use 5 to 100% by weight of a vinyl chloride based resin, 2 to 50% by weight of a polyurethane resin and 2 to 100% by weight of a polyisocyanate as the binder resin.

The packing degree of the hexagonal ferrite magnetic powder in the magnetic layer can be calculated from the σs of the used hexagonal ferrite magnetic powder and the maximum magnetic flux density (Bm) by the formula (Bm/4πσs). In the invention, the value is preferably 1.1 to 3.2 $g/cm^3$, more preferably 1.2 to 3.0 $g/cm^3$.

In the invention, in the case a polyurethane is used, one having a glass transition temperature of −50 to 100° C., a breaking elongation of 100 to 2000%, a rupture stress of 0.05 to 10 kg/mm$^2$ (0.49 to 98 MPa), and a yield point of 0.05 to 10 kg/mm$^2$ (0.49 to 98 MPa) is preferable. Examples of the polyisocyanate to be used in the invention include an isocyanate such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, a product of such an isocyanate and an alcohol, and a polyisocyanate produced by condensation of an isocyanate. Examples of the commercially available products of these isocyanates include Colonate L, Colonate HL, Colonate 2030, Colonate 2031, Millionate MR and Millonate MTL produced by Nippon Polyurethane Industry Co., Ltd., Takenate D-102, Takenate D-110N, Takenate D-200 and Takenate D-202 produced by Takeda Chemical Industries, Ltd., and Desmodur L, DesmodurIL, Desmodur N, Desmodur HL produced by Sumitomo Bayer Co. Ltd. These can be used alone or a combination of two or more thereof utilizing the difference in the curing reactivity.

The magnetic layer of the magnetic recording medium of the invention may ordinarily contain materials having various functions, such as a lubricating agent, an abrasive, a dispersing agent, an antistatic agent, a dispersing agent, a plasticizing agent, or an antifungal according to the purpose thereof.

The lubricating agent to be used in the magnetic layer of the invention include silicone oils such as a dialkyl polysiloxane (the alkyl has 1 to 5 carbon atoms), dialkoxy polysiloxane (the alkoxy has 1 to 4 carbon atoms), a monoalkyl monoalkoxy polysiloxane (the alkyl has 1 to 5 carbon atoms, and the alkoxy has 1 to 4 carbon atoms), a phenyl polysiloxane, and a fluoroalkyl polysiloxane (the alkyl has 1 to 5 carbon atoms); conductive fine powders such as graphite; inorganic powders such as molybdenum disulfide, and tungsten disulfide; plastic fine powders such as polyethylene, polypropylene, polyethylene vinyl chloride copolymer, and polytetrafluoroethylene; α-olefin polymers; saturated fatty acids (having 10 to 22 carbon atoms) solid in an ordinary temperature; unsaturated aliphatic hydrocarbons (compounds having about 20 carbon atoms and an n-olefin double bond connected to the terminal carbon atom) liquid at an ordinary temperature; fatty acid esters of monobasic fatty acid having 12 to 20 carbon atoms and monohydric alcohol having 3 to 12 carbon atoms, and fluorocarbons.

Among the examples, the saturated fatty acids and the fatty acid esters are preferable, and a combination thereof is more preferable. Examples of the alcohols for the material of the fatty acid esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether and s-butyl alcohol, and polyhydric alcohols such as ethylene glycol, diethylene glycol, neopentylglycol, glycerol, and a sorbitan derivative. Examples of the fatty acid include aliphatic carboxylic acids such as acetic acid, propionic acid, octanoic acid, 2-ethyl hexanoic acid, lauric acid, myristic acid, stearic acid, palmitic acid, behenic acid, arachic acid, oleic acid, linoleic acid, linolenic acid, elaidic acid and palmitoleic acid.

Specific examples of the fatty acid esters include various kinds of ester compounds such as butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethyl-hexyl myristate, a mixture of butyl stearate and butyl palmitate, butoxyethyl stearate, 2-butoxy-1-propyl stearate, dipropylene glycol monobutyl ether acylated by stearic acid, diethylene glycol dipalmitate, a diol obtained by acylating hexamethylene diol by myristic acid, and oleate of glycerol.

Furthermore, in order to restrain hydrolysis of the fatty acid ester frequently occurred at the time of using the magnetic recording medium under a high humidity condition, isomer structure such as branched/straight-chain or cis/trans and the branched position of the fatty acid and the alcohol as the raw materials are appropriately selected.

The lubricating agent is ordinarily added in a range of 0.2 to 20 parts by weight based on 100 parts by weight of a binder.

As the lubricating agent, the following compounds can also be used. That is, silicone oil, graphite, molybdenum disulfide, boron nitride, fluorinated graphite, fluorinated alcohol, a polyolefin, a polyglycol, an alkyl phosphate, tungsten disulfide, or the like can be used.

As the abrasive to be used in the magnetic layer of the invention, commonly used materials such as α- or γ-alumina, molten alumina, corundum, artificial corundum, silicon carbonate, chromium oxide ($Cr_2O_3$), diamond, artificial diamond, garnet, emery (main component: corundumandmagnetite), α-$Fe_2O_3$, or the like can be used. These abrasives have a Mohs' hardness of 6 or more. Specific examples of the abrasive include AKP-10, AKP-15, AKP-20, AKP-30, AKP-50, AKP-1520, AKP-1500, HIT-50, HIT60A, HIT60G, HIT70, HIT80, HIT82 and HIT-100 produced by Sumitomo Chemical Co., Ltd., G5, G7, S-1 and Chromium oxide K produced by Nippon Chemical Industrial Co., Ltd., UB40B produced by Uemura Kogyo & Co., Ltd., WA8000 and WA10000 produced by Fujimi Corp., LS600F 0/-1/4 produced by LANDS Corp., MD-200, MD-150, MD-100, MD-70, IRM 0-1/4F and IRM 0-1/4FF produced by Tomei Diamond Co., Ltd., 0-1/10 and 0-1/4 produced by GE Co., Mypolex 1/10QG and Mypolex 1/8QG produced by E. I. Du Pont de Nemours & Co., and TF100, TF140 and TF180 produced by Toda Kogyo Corp. The abrasive having an average particle size of 0.05 to 1 μm are effectively used. Preferably, the average particle size thereof is 0.05 to 0.5 μm.

The abrasives can be used preferably not only alone but also in a combination of two or more thereof. In the case of fine particles of diamond, the amount thereof can be reduced to about 0.1% based on the magnetic substance by using together with other abrasives. The total amount of the abrasive used is in a range of 1 to 20 parts by weight, preferably 1 to 15 parts by weight based on 100 parts by weight of the magnetic substance. When it is smaller than 1 part by weight, a sufficient durability cannot be obtained. On the other hand, when it is larger than 20 parts by weight, the surface property and the packing degree are deteriorated. The abrasives may be added into the magnetic coating after subjecting dispersion treatment with a binder.

In the magnetic layer of the magnetic recording medium of the invention, a conductive particle may be contained as an antistatic agent in addition to the non-magnetic powder. In particular, it is preferable to add a carbon black as the antistatic agent in order to lower the surface electric resistance of the medium as a whole. The carbon black used in the invention includes, for example, furnace black for rubber, thermal black for rubber, carbon black for coloring, conductive carbon black, and acetylene black. It is preferred for the carbon black to have a specific surface area of 5 to 500 m²/g, a DBP oil absorption amount of 10 to 1,500 ml/100 g, a particle size of 5 to 300 nm, pH of 2 to 10, a water content of 0.1 to 10%, and a tap density of 0.1 to 1 g/cm³. Specific examples of the carbon black used in the invention include BLACK PEARLS 2000, 1300, 1000, 900, 800 and 700 and VULCAN XC-72 produced by Cabot Corp., #80, #60, #55, #50 and #35 produced by Asahi Carbon Co., Ltd., #3030B, #3040B, #3050B, #3230B, #3350B, #9180B, #2700, #2650, #2600, #2400B, #2300, #950B, #900, #1000, #95, #30, #40, #10B, MA230,MA220 and MA77produced by Mitsubishi Chemical Corp., CONDUCTEX SC, RAVEN 150, 50, 40 and 15 produced by Columbian Chemical Company, Ketjen Black EC, Ketjen Black ECDJ-500 and Ketjen Black ECDJ-600 produced by Lion Akzo Co., Ltd. The carbon black may be used after surface treatment by a dispersing agent, oxidation treatment, grafting by a resin, or graphite treatment of a part of the surface thereof. Moreover, the carbon black may be dispersed preliminarily in a binder before adding to the magnetic coating. In the case of using carbon black in the magnetic layer, the amount thereof is preferably 0.1 to 30% by weight based on the magnetic substance. Furthermore, it is preferable to incorporate the carbon black into a non-magnetic layer described below in an amount of 3 to 20% by weight based on the total amount of magnetic powder in the non-magnetic layer.

In general, the carbon black functions not only as an antistatic agent, but also for reducing the friction coefficient, providing the light-shielding property, improving the film strength, or the like. The function differs depending on the carbon black to be used. Therefore, the carbon blacks can be selectively used in the invention by changing the kinds, the amounts, and the combination according to the purposes based on the characteristics such as the particle size, the oil absorption amount, the conductivity, and the pH as described above. The carbon black to be used can be selected with reference to, for example, "Carbon Black Handbook" edited by the Carbon Black Society.

The magnetic recording medium including the magnetic layer containing the hexagonal ferrite magnetic powder according to the invention is not particularly limited as long as it has a configuration having a non-magnetic layer provided between a support and the magnetic layer, and thus a known layer configuration can be adopted. The non-magnetic layer (also referred to as the under layer) is preferably a layer containing non-magnetic powder dispersed in a binder resin. As the non-magnetic powder used in the non-magnetic layer, various powders can be used. For example, aluminum oxide having an α-alumina content of 90% or more, β-alumina, γ-alumina, silicon carbide, chromium oxide, cerium oxide, α-iron oxide, goethite, corundum, silicon nitride, titanium carbide, titanium oxide, silicon dioxide, boron nitride, zinc oxide, calcium carbonate, calcium sulfate, barium sulfate can be used alone or as a combination thereof. α-ironoxide, goethite, titanium oxide, and zinc oxide are preferable since they are fine and have a uniform particle size. The particle size of the non-magnetic powders is preferably 0.01 to 1 μm. However, if desired, for achieving a wide particle size distribution non-magnetic powders with different particle sizes each other are used in combination, or a single non-magnetic powder having a wide particle size distribution is used for obtaining the same effect. In order to increase the interaction with the binder resin to be used for improving the dispersing property, the non-magnetic powder to be used may be subjected to surface treatment. The substance existing on the particle surface by the surface treatment includes an inorganic substance such as silica, alumina, and silica-alumina, and a substance formed by a coupling agent. It is preferred for the non-magnetic powder to have a tap density of 0.3 to 2 g/cm³, a water content of 0.1 to 5% by weight, a pH of 2 to 11, and a specific surface area of 5 to 100 m²/g. The form of non-magnetic powder may be a needle-like form, a spherical form, a cubic form or a tabular form.

Specific examples of the non-magnetic powders include Nanotite produced by Showa Denko K. K., HIT-100 and HIT-80 produced by Sumitomo Chemical Co., Ltd., α-iron oxide DPN-250BX, DPN-245, DPN-270BX, DPN-550BX, DPN-550RX, DBN-450BX, DBN-650RX and DAN-850RX produced by Toda Kogyo Corp., titanium oxide TTO-51B, TTO-55A, TTO-55B, TTO-55C, TTO-55S, TTO-55D and SN-100 produced by Ishihara Sangyo Co., Ltd., titanium oxide STT-4D, STT-30D, STT-30 and STT-65C produced by Titan Kogyo K. K., titanium oxide MT-100S, MT-100T, MT-150W, MT-500B, MT-600B, MT-100F and MT-500HD produced by TaycaCorp., FINEX-25, BF-1, BF-10, BF-20 and ST-M produced by Sakai Chemical Industry Co., Ltd., iron oxide DEFIC-Y and DEFIC-R produced by Dowa Mining Co.; Ltd., AS2BM and TiO2 P25 produced by Nippon Aerosil Co., Ltd., 100A and 500A produced by Ube Industries, Ltd., and baked products thereof.

It is effective to form a plurality of coating layers on a support as described above for producing a magnetic recording medium with a high recording density. A simultaneous coating method is particularly preferable since a super thin magnetic layer can be produced. Specific examples of the simultaneous coating method, that is, a wet on wet method include:

(1) a method of coating an under layer by a gravure coating, roll coating, blade coating, or extrusion coating device commonly used for a magnetic coating, and while the under layer is still in a wet state, an upper layer is coated by a support-press-type extrusion coating device disclosed, for example, in JP-B-1-46186, JP-A-60-238179, and JP-A-2-265672, (2) a method of coating an under layer coating solution and an upper layer coating solution substantially simultaneously by a coating head having two slits for passing the coating solutions as disclosed in JP-A-63-88080, JP-B-2-17971, and JP-A-2-265672, (3) a method of coating an upper layer and an under layer substantially simultaneously by an extrusion coating device equipped with a backup roll disclosed in JP-A-2-174965.

In the case of coating by the wet on wet method, the fluid characteristics of the magnetic layer coating solution and the non-magnetic layer coating solution are preferably close as possible for eliminating disturbance of the interface between the magnetic layer and non-magnetic layer coated so as to obtain the magnetic layer of an uniform thickness with little thickness fluctuation. Since the fluid characteristics of the coating solution strongly depends on the combination of the powder particle and the binder resin in the coating solution, the non-magnetic powder used in the non-magnetic layer should be carefully selected. The thickness of support of the magnetic recording medium is ordinarily 3 to 100 μm. When the magnetic recording material is used in the form of a tape, the thickness thereof is preferably 3 to 20 μm, and when the magnetic recording material is used as a flexible disc, it is preferably 25 to 80 μm. The thickness of non-magnetic layer provided on the support is ordinarily 0.5 to 5.0 μm, preferably 0.5 to 3 μm. The thickness of magnetic layer is preferably 0.01 to 0.5 µm, more preferably 0.05 to 0.3 µm. Moreover, a layer other than the magnetic layer and the non-magnetic layer maybe formed according to the purpose. For example, an under-coat layer can be provided between the support and the under layer for improving adhesion therebetween. The thickness thereof is ordinarily 0.01 to 1.0 µm, preferably 0.05 to 0.3 µm. Moreover, aback layer can be provided on the support surface on the opposite side to the surface carrying the magnetic layer. The thickness thereof is ordinarily 0.1 to 1.0 µm, preferably 0.3 to 1.0 µm. As the under-coat layer and the back layer, those commonly known can be used. In the case of a disc-form magnetic recording medium, the configuration including the magnetic layer described above can be provided on both surfaces or on one surface of the support.

The support used in the invention is not particularly limited, and those ordinarily used can be used. Examples of the material for the support include films of various synthetic resins such as polyethylene terephthalate, polyethylene, polypropylene, polycarbonate, polyethylene naphthalate, polyamide, polyamide imide, polyimide, polysulfon and polyether sulfon, and metal foils such as an aluminum foil and a stainless steel foil.

In order to effectively achieve the objects of the invention, the surface roughness of the support is ordinarily 0.03 µm or less, preferably 0.02 µm or less, more preferably 0.01 µm or less in terms of the center line average surface roughness (cutoff value: 0.25 mm). Moreover, not only the support has a small center line average surface roughness, but it preferably does not have a coarse projection of 1 µm or more. The surface roughness form is appropriately controlled by the size and the amount of a filler added to the support. Examples of the filler include oxides and carbonates of Ca, Al, Si, Ti, or the like, and organic resin fine powders such as acrylic resin fine powder, or the like. The F-5 value of support in the web running direction used in the invention is preferably 5 to 50 kg/mm$^2$ (49 to 490 MPa), and the F-5 value in the web width direction is preferably 3 to 30 kg/mm$^2$ (29.4 to 294 MPa). In general, the F-5 value in the web longitudinal direction is higher than the F-5 value in the web width direction, but it is not limited thereto in the case the width direction strength should be reinforced.

Moreover, the heat shrinkage degree of the support in the web running direction and the width direction at 100° C., 30 minutes is preferably 3% or less, more preferably 1.5% or less, and the heat shrinkage degree at 80° C., 30 minutes is preferably 1% or less, more preferably 0.5% or less. It is preferable that the breaking strength in both directions is 5 to 100 kg/mm$^2$ (49 to 980 MPa), and the elastic modulus is 100 to 2,000 kg/mm$^2$ (980 to 19,600 MPa).

The organic solvents used in the invention include, for example, ketones such as acetone, methyl ethyl ketone, methyl isobutyl ketone, diisobutyl ketone, cyclohexanone, isophorone, and tetrahydrofuran, alcohols such as methanol, ethanol, propanol, butanol, isobutyl alcohol, isopropyl alcohol, and methyl cyclohexanol, esters such as methyl acetate, butyl acetate, isobutyl acetate, isopropyl acetate, ethyl lactate, and glycol acetate, ethers such as glycol dimethylether, glycol monoethylether, and dioxane, aromatic hydrocarbons such as benzene, toluene, xylene, cresol, and chlorbenzene, chlorinated hydrocarbons such as methylene chloride, ethylene chloride, carbon tetrachloride, chloroform, ethylene chlorohydrin, and dichlorobenzene, N,N-dimethylformamide, and hexane, The solvent can be used as a mixture thereof at an appropriate ratio. These organic solvents need not be 100% pure products, and may contain impurities such as an isomer, an unreacted material, a side-reaction product, a decomposed material, an oxide, and water in addition to the main component. The content of impurities is preferably 30% or less, more preferably 10% or less. The kind and the amount of the organic solvents used in the invention may be changed for each layer, if desired. For example, the surface property can be improved by using a solvent with a high volatility in the under layer, the coating stability can be improved by using a solvent with a high surface tension (e.g., cyclohexanone or dioxane) in the under layer, or the packing degree can be improved by using a solvent with a high solubility parameter in the magnetic layer, but it is not limited to these examples.

The magnetic recording medium of the invention can be obtained by kneading and dispersing the ferromagnetic powder and the binder resin, and other additives, if desired, using an organic solvent, applying the magnetic coating on a support, orientating, if desired, and drying.

The production step of the magnetic coating and the non-magnetic coating includes at least a kneading step, a dispersing step, and a mixing step provided, if desired, before or after these steps. Each step may be divided into two or more stages. All the raw materials used in the invention, such as the magnetic substance, the non-magnetic powder, the binder, carbon black, an abrasive, an antistatic agent, a lubricating agent, and a solvent may be added at the beginning or in the middle of any step. Moreover, each raw material may be separately added in two or more steps. For example, polyurethane may be separately added in the kneading step, the dispersing step, and the mixing step for controlling the viscosity after the dispersion.

For the kneading and dispersing of the magnetic coating, various kinds of kneading machines can be used. For example, a two roll mill, a three roll mill, a ball mill, a pebble mill, a tolon mill, a sand grinder, Szegvari, an attriter, a high speed impeller dispersing machine, a high speed stone mill, a high speed impact mill, a disper, a kneader, a high speed mixer, a homogenizer, an ultrasonic dispersing machine can be used.

It is preferable to use a kneader having a strong kneading force, such as a continuous kneader and a pressure kneader in the kneading step for obtaining a higher residual magnetic flux density in the magnetic recording medium. In the case of using the continuous kneader of the pressure kneader, the magnetic substance, and all or a part of the binder (preferably 30% or more of the total binder) or 15 to 500 parts by weight of the binder based on 100 parts by weight of the magnetic substance are kneaded. Details of the kneading process are disclosed in JP-A-1-106338, and JP-A-64-79274. In the invention, by using the simultaneous multilayer coating method as disclosed in JP-A-62-212933, efficient production of the magnetic recording medium can be enabled.

The residual solvent contained in the magnetic layer of the magnetic recording medium of the invention is preferably 100 mg/mm$^2$ or less, more preferably 10 mg/mm$^2$ or less. The residual solvent contained in the magnetic layer is preferably less than the residual solvent contained in the non-magnetic layer.

The porosity of the magnetic layer is preferably 30% by volume or less, more preferably 10% by volume or less in both the under layer and the uppermost layer. It is preferable that the porosity of the non-magnetic layer is larger than the porosity of the magnetic layer, but as long as the porosity of the non-magnetic layer is 5% by volume or more, the porosity of the non-magnetic layer may be smaller than the porosity of the magnetic layer.

In the invention, it is easily understood that these physical properties can be changed in the under layer and the magnetic layer according to the purposes. For example, by increasing the elastic modulus of the magnetic layer the running durability is improved, and at the same time by controlling for the under layer to have the elastic modulus lower than that of the magnetic layer, the touching property of the magnetic recording medium to a magnetic head is improved.

The magnetic layer, or the like coated on the support by the method described above is, if desired, treated by a process for orienting the ferromagnetic powder in the magnetic layer, and then the magnetic layer is dried. Moreover, the magnetic layer is subjected to the surface smoothing treatment, if desired, and is cut into a desired form to produce the magnetic recording medium according to the invention.

The elastic modulus of the magnetic layer at the 0.5% elongation is preferably 100 to 2,000 kg/mm$^2$ (980 to 19,600 MPa) in both the web coating direction and the width direction, the breaking strength is preferably 1 to 30 kg/cm$^2$ (98 to 2,940 KPa), the elastic modulus of the magnetic recording medium is preferably 100 to 1,500 kg/mm$^2$ (980 to 14,700 MPa) in both the web coating direction and the width direction, the residual elongation is preferably 0.5% or less, and the heat shrinkage factor at any temperature up to 100° C. is preferably 1% or less, more preferably 0.5% or less, still more preferably 0.1% or less.

The magnetic recording medium according to the invention may be a tape for video application or audio application, or a floppy disc or a magnetic disc for data recording application, but it is particularly effective for a medium for the digital recording application, in which lack of a signal due to generation of dropout is the fatal defect. Furthermore, by making the magnetic layer thickness to be 0.5 µm or less in the multilayer configuration of the non-magnetic layer and the magnetic layer, a magnetic recording medium which has high electromagnetic characteristics, excellent overwrite property, high density and large capacity can be obtained.

Novel features of the invention will be described specifically in the following examples.

Hereinafter, the examples of the invention will be explained, but the invention should not be construed as being limited thereto.

<Production of Hexagonal Ferrite Magnetic Powder>

As raw materials for the hexagonal ferrites, various compounds shown below were measured in terms of the oxide. The amounts of X, Y and Z of the components and the characteristics of the magnetic powders obtained (Examples 1 to 4 and Comparative Examples 1 to 2) are shown in Table 1. In Table 1, the magnetic powder F disclosed in JP-A-8-115518 is also shown as Comparative Example 3.

| | |
|---|---|
| B$_2$O$_3$ | 4.7 mole |
| BaCO$_3$ | 10.0 mole |
| Fe$_2$O$_3$ | X mole |
| CoCO$_3$ | 0.05 × X mole |
| ZnO | Y mole |
| Nb$_2$O$_5$ | Z mole |

After mixing the compounds described above sufficiently by a powder mixer, the mixture was placed in a Pt-Rh crucible equipped with an agitator, heated at 1,300 to 1,350° C. for 2 hours to melt, and ejected between rotating stainless steel cooling double rolls to obtain an amorphous product, followed by subjecting to a pulverizing process. Next, the amorphous product was spread on a metal container in a thickness of 2 cm and conveyed into an electric furnace maintained at 600° C., followed by keeping therein for 1 hour. Then, it was conveyed immediately into an electric furnace maintained at 850° C. and kept therein for 1 hour. Thereafter, the product was introduced into a metal hopper at a room temperature, and cooled to obtain a crystalline powder. The crystalline powder was pulverized by a planetary mill, soaked in a 2 mol/l aqueous solution of acetic acid, kept at 80° C. for 5 hours for eliminating the glass component, and filtrated to collect fine crystals. The collected fine crystals were washed with a large amount of ion-exchanged water, dehydrated, dried at 100° C., and further subjected to consolidation by a marler to obtain a ferromagnetic powder. According to analysis of the ferromagnetic powder by an X ray diffraction method, a magneto plumbite structure was observed. The ferromagnetic powder was observed by a transmission type electron microscope for measuring the average powder size. It was subjected to degassing in a nitrogen gas at 250° C. for 30 minutes, and the specific surface area was measured by the BET method. The composition and the magnetic characteristics of the obtained barium ferrite are shown in Table 1. In Comparative Example 2, the amorphous product obtained in Example 1 was spread on a metal container in a thickness of 2 cm, conveyed into an electric furnace maintained at 600° C. and kept therein for 1 hour, and immediately conveyed into an electric furnace maintained at 850° C. and kept therein for 3 hours. Thereafter, it was treated in the same manner as in the Examples.

TABLE 1

| Magnetic powder | Unit | X Mole | Y Mole | Z Mole | Average tabular diameter nm | Average tabular thickness nm | Specific surface area m$^2$/g | Hc kA/m | σs A · m$^2$/kg |
|---|---|---|---|---|---|---|---|---|---|
| Example 1 | | 11.3 | 0.50 | 0.11 | 22.7 | 6.6 | 67.2 | 145.2 | 49.2 |
| Example 2 | | 11.9 | 0.35 | 0.11 | 22.2 | 7 | 68.3 | 190.5 | 50.8 |
| Example 3 | | 12.5 | 0.20 | 0.11 | 22.4 | 6.8 | 67.8 | 233.2 | 51.2 |
| Example 4 | | 13.1 | 0.20 | 0.08 | 19.5 | 6.5 | 74.6 | 196.9 | 46.4 |
| Comparative Example 1 | | 11.0 | 0.62 | 0.35 | 33.2 | 8.2 | 43.3 | 150.3 | 47.3 |
| Comparative Example 2 | | 11.3 | 0.50 | 0.11 | 36.2 | 9.6 | 37.8 | 148.5 | 54.5 |
| Comparative Example 3 | | Magnetic Powder F of JP-A-8-115518 | | | 30 | 10 | 34 | 143.2 | 61 |

<Production of Coating>

In the examples, the term "part" denotes "part by weight".

Magnetic coating solution composition 1

Barium ferrite (magnetic powder shown in Table 2) 100 parts

Binder resin

Vinyl chloride copolymer 12 parts (containing $1 \times 10^{-4}$ eq/g of —$SO_3K$ group, polymerization degree: 300)

Polyester polyurethane resin 4 parts (neopentyl glycol/caprolactone polyol/MDI=0.9/2.6/1, containing $1 \times 10^{-4}$ eq/g of —$SO_3Na$ group)

Phenyl phosphonic acid 3 parts

α-Alumina (average particle size: 0.15 μm) 2 parts

Carbon black (average particle size: 30 nm) 5 parts

Butyl stearate 1 part

Stearic acid 2 parts

Methyl ethyl ketone 125 parts

Cyclohexanone 125 parts

Magnetic coating solution composition 2

Barium ferrite (magnetic powder shown in Table 2) 100 parts

Binder resin

Vinyl chloride copolymer 15 parts (containing $1 \times 10^{-4}$ eq/g of —$SO_3K$ group, polymerization degree: 300)

Polyester polyurethane resin 6 parts (neopentyl glycol/caprolactone polyol/MDI=0.9/2.6/1, containing $1 \times 10^{-4}$ eq/g of —$SO_3Na$ group)

Phenyl phosphonic acid 3 parts

α-Alumina (average particle size: 0.15 μm) 2 parts

Carbon black (average particle size: 30 nm) 5 parts

Butyl stearate 1 part

Stearic acid 2 parts

Methyl ethyl ketone 125 parts

Cyclohexanone 125 parts

Non-magnetic coating solution composition

Needle-like hematite 80 parts (specific surface area by the BET method: 55 $m^2/g$, average major axis length: 0.10 μm, average needle-like ratio: 7, pH: 8.8, aluminum treatment: 1% by weight as $Al_2O_3$)

Carbon black 20 parts (average particle size: 17 nm, DBP oil absorption amount: 80 ml/100 g, specific surface area by the BET method: 240 $m^2/g$, pH 7.5)

Binder resin (containing $1 \times 10^{-4}$ eq/g of —$SO_3K$ group, polymerization degree: 300)

Polyester polyurethane resin 5 parts (neopentyl glycol/caprolactone polyol/MDI=0.9/2.6/1, containing $1 \times 10^{-4}$ eq/g of —$SO_3Na$ group)

Phenyl phosphonic acid 3 parts

Butyl stearate 3 parts

Stearic acid 3 parts

Mixed solvent of methylethyl ketone and cyclohexanone (1:1) 280 parts

With each of the magnetic coating solution compositions 1 and 2 and the non-magnetic solid composition, the pigment, polyvinyl chloride, phenyl phosphinic acid and 50% by weight of the prescribed amount of each solvent were kneaded by a kneader. Then, the polyurethane resin and the remaining components were added to the mixture, followed by dispersing by a sand grinder. Isocyanate was added to the resulting dispersion for the non-magnetic coating solution in an amount of 15 parts, and to the resulting dispersion for the magnetic coating solution in an amount of 14 parts. Furthermore, 30 parts of cyclohexanone was added to each of them. They were filtrated by a filter having an average pore diameter 1 μm to prepare coating solutions for the non-magnetic layer and the magnetic layer.

Production of tape 1

EXAMPLES 11 to 16, COMPARATIVE EXAMPLES 11 to 15

The coating solution for the under non-magnetic layer was applied on a 7 μm thick polyethylene terephthalate support so as to have a 1.5 μm thickness after drying. Furthermore, immediately thereafter, while the non-magnetic layer was still in the wet state, the coating solution for the magnetic layer having the composition shown in Table 2 was coated so as to have about a 0.15 μm thickness after drying by a wet simultaneous double layer coating method. While both layers are still in the wet state, the coating was passed through a magnetic orientation apparatus to orient in the lengthwise direction. Specifically, the coating was passed through a rare earth magnet (surface magnetic flux 500 mT) and then through a solenoid magnet (magnetic flux density 500 mT), and dried in the solenoid to the extent that the orientation was not offset. After further drying the magnetic layer, the material was wound up. Thereafter, calender treatment was conducted using a seven stage calendar comprising metal rolls at a 90° C. to obtain a web-form magnetic recording medium. By slitting the magnetic recording medium into a 8 mm width to produce a 8 mm video tape sample.

Production of tape 2

EXAMPLES 21, 22, COMPARATIVE EXAMPLE 21

The coating solution for the under non-magnetic layer was applied on a 7 μm thick polyethylene terephthalate support so as to have a 1.5 μm thickness after drying. Furthermore, immediately thereafter, while the non-magnetic layer was still in the wet state, the coating solution for the magnetic layer having the magnetic coating solution composition 1 describe above was coated so as to change the thickness of the layer based on changing the amount of coating using a wet simultaneous double layer coating method. While both layers are still in the wet state, the coating was passed through a magnetic orientation apparatus to orient in the lengthwise direction to obtain samples having different thickness of the magnetic layer. Specifically, the coating was passed through a rare earth magnet (surface magnetic flux 500 mT) and then through a solenoid magnet (magnetic flux density 500 mT), and dried in the solenoid to the extent that the orientation was not offset. After further drying the magnetic layer, the material was wound up. Thereafter, calendar treatment was conducted using a seven stage calendar comprising metal rolls at a 90° C. to obtain a web-form magnetic recording medium. By slitting the magnetic recording medium into a 8 mm width to produce a 8 mm video tape sample.

<Tape Evaluation>

With each of the samples obtained, the magnetic characteristics, the remanence curve and the fluctuation field (Hf) were measured by a vibrating sample magnetometer, and the surface roughness and the electromagnetic characteristics were also measured.

The electromagnetic characteristics were measured as follows. On a 8 mm deck for data recording, were mounted an MIG head (head gap: 0.2 μm, track width: 17 μm, saturated magnetic flux density: 1.5 T, azimuth angle: 20°), and an MR head for reproduction (SAL bias, MR element: Fe—Ni, track width: 6 μm, gap length: 0.2 μm, azimuth angle: 20°). Using the MIG head, the relative speed of the tape and the head was set at 10.2 m/second, and the optimum recording current was determined from the input-output characteristics of ½ Tb (λ=0.5 μm). With the current, signals were recorded and reproduced by the MR head. The C/N was defined to be from the peak of reproduced carrier to the integrated noise, and the resolution band width of a spectrum analyzer was defined to be 100 kHz. The electromagnetic characteristics were indicated using those of the tape of Comparative Example 11 as control.

As to the surface roughness, using a light coherent three-dimensional roughness meter "TOPO-3D" manufactured by WYKO Corporation of Arizona, U.S.A., the sample area of a 250 μm square was measured. At the calculation of the measured value, the corrections including the inclination correction, the spherical correction, the cylindrical correction, and the like were conducted according to JIS-B601, and the center plane average surface roughness Ra was used as the surface roughness value.

The magnetic characteristics were measured using a vibrating sample magnetometer (produced by Toei Industry Co., Ltd.) by applying an external magnetic field of 796 kA/m in parallel to the orientation direction. Specifically, the sample of magnetic recording medium was so set on the vibrating sample magnetometer produced by Toei Industry Co., Ltd. that the orientation direction of the sample became the same direction as the magnetic field. After the AC erasure of the sample so as to have the residual magnetization of 0.0005 A.m²/kg or less, a magnetic field of 7.96 kA/m was applied, then the magnetic field was returned to 0 and the residual magnetization Mr was measured. The applied magnetic field was changed by 7.96 kA/m each, the residual magnetization was repeatedly measured, and the remanence curve Ir(H) was determined. Further, after applying −796 kA/m for the DC saturation, the magnetic field was returned to 0 and the residual magnetization (−Mrmax) was measured. After applying a magnetic field of 7.96 kA/m in the inverse direction, the magnetic field was returned to 0 and the residual magnetization Mr was measured. The applied magnetic field was changed by 7.96 kA/m each, the residual magnetization was repeatedly measured, and the remanence curve Id(H) was determined. From the isothermal remanence curve Ir(H) and remanence curve Id(H) thus obtained, $\Delta M = Id(H) - (1 - 2Ir(H))$ was calculated at each measured magnetic field. The $\Delta M$'s of Examples 12, 14 and 15, and Comparative Examples 11 and 13 are shown in FIG. 1. The maximum value of $\Delta M$ at the plus side of the $\Delta M$ curve was defined as $\Delta M$max.

After the DC saturation magnetization, the same magnetic field as that of the tape Hc was applied in the inverse direction. The magnetization attenuation was measured for 1,000 seconds, and gradient (S) of the magnetization attenuation for 10 to 1,000 seconds to In(natural log.)t (t: time in second) was determined. By standardizing the gradient (S) by the residual magnetization Mr, the magnetization attenuation gradient was obtained. The irreversible susceptibility $\chi$irre (the numerical value of the difference of residual magnetization in the vicinity of the Hc was used) was determined from the remanence curve, and the fluctuation field (Hf) was calculated using the formula Hf=S/$\chi$irre. From the Hf, the activated volume Va can be calculated by the formula Va=kT/(Ms·Hf), wherein k is Boltzmann constant, T is absolute temperature, and Ms is saturated magnetization per volume. A small value of the Hf is preferable since the magnetic medium is stable to the heat fluctuation.

The thus-obtained characteristics are shown in Tables 2 and 3. The magnetic recording media using the fine hexagonal ferrite according to the invention exhibit a low noise level and a high C/N owing to the small volume compared with the comparative examples. Although the hexagonal ferrite particles are concerned about their heat fluctuation because of their small size, the attenuation gradient equivalent to or more than that of the hard discs conventionally used can be obtained by controlling the maximum value of $\Delta M$ ($\Delta M$max) in the range of 0.10 or less. Thus, it can be provided for the practical use.

TABLE 2

| No. | Number of magnetic substance used | Magnetic coating solution recipe | Hc (kA/m) | Hk (kA/m) | Hc/Hk | Maximum value of $\Delta M$ | Magnetic layer thickness $\delta$ (μm) | Br·$\delta$ (mT·μm) | SQ | Hf (kA/m) | Attenuation gradient ($\Delta S$) | Surface roughness (nm) | Output (dB) | C/N (dB) |
|---|---|---|---|---|---|---|---|---|---|---|---|---|---|---|
| Example 11 | Example 1 | 1 | 161.1 | 432.4 | 0.37 | 0.081 | 0.16 | 12.9 | 0.621 | 1.19 | 0.036 | 2.8 | 1.5 | 6.0 |
| Example 12 | Example 2 | 1 | 206.4 | 499.2 | 0.41 | 0.077 | 0.15 | 12.8 | 0.633 | 1.16 | 0.035 | 2.7 | 1.8 | 6.2 |
| Example 13 | Example 3 | 1 | 249.5 | 615.5 | 0.38 | 0.088 | 0.15 | 13.4 | 0.641 | 1.05 | 0.032 | 2.7 | 2.1 | 6.5 |
| Example 14 | Example 4 | 1 | 212.7 | 559.3 | 0.38 | 0.048 | 0.16 | 13.3 | 0.615 | 1.59 | 0.041 | 2.5 | 1.8 | 6.4 |
| Example 15 | Example 1 | 2 | 161.8 | 417.6 | 0.39 | 0.072 | 0.14 | 12.3 | 0.622 | 1.15 | 0.035 | 2.6 | 1.4 | 6.2 |
| Example 16 | Example 3 | 2 | 250.1 | 544.4 | 0.46 | 0.082 | 0.14 | 12.7 | 0.641 | 1.01 | 0.033 | 2.4 | 2.0 | 6.8 |
| Comp. Example 11 | Comp. Example 1 | 1 | 166.2 | 369.1 | 0.45 | 0.201 | 0.15 | 14.6 | 0.651 | 2.55 | 0.055 | 3.1 | 0.0 | 0.0 |
| Comp. Example 12 | Comp. Example 2 | 1 | 164.5 | 511.8 | 0.32 | 0.195 | 0.16 | 17.5 | 0.675 | 2.13 | 0.062 | 3.3 | −0.2 | −0.5 |
| Comp. Example 13 | Comp. Example 1 | 2 | 166.4 | 354.1 | 0.47 | 0.285 | 0.15 | 14.1 | 0.652 | 2.54 | 0.055 | 3.1 | −0.4 | −2.3 |

TABLE 2-continued

| No. | Number of magnetic substance used | Magnetic coating solution recipe | Hc (kA/m) | Hk (kA/m) | Hc/Hk | Maximum value of ΔM | Magnetic layer thickness δ (μm) | Br · δ (mT · μm) | SQ | Hf (kA/m) | Attenuation gradient (ΔS) | Surface roughness (nm) | Output (dB) | C/N (dB) |
|---|---|---|---|---|---|---|---|---|---|---|---|---|---|---|
| Comp. Example 14 | Comp. Example 2 | 2 | 164.7 | 496.5 | 0.33 | 0.278 | 0.15 | 16.2 | 0.676 | 2.13 | 0.063 | 3.2 | −0.3 | −2.1 |
| Comp. Example 15 | Comp. Example 3 | 1 | 150.5 | 530.1 | 0.28 | 0.326 | 0.15 | 27.8 | 0.86 | 2.86 | 0.073 | 3.5 | 0.3 | −3.4 |

TABLE 3

| No. | Number of magnetic substance used | Magnetic coating solution recipe | Hc (kA/m) | Hk (kA/m) | Hc/Hk | Maximum value of ΔM | Magnetic layer thickness δ (μm) | Br · δ (mT · μm) | SQ | Hf (kA/m) | Attenuation gradient (ΔS) | Surface roughness (nm) | Output (dB) | C/N (dB) |
|---|---|---|---|---|---|---|---|---|---|---|---|---|---|---|
| Example 21 | Example 2 | 1 | 206.1 | 499.1 | 0.41 | 0.085 | 0.30 | 25.6 | 0.631 | 1.16 | 0.035 | 2.8 | 1.5 | 5.8 |
| Example 22 | Example 2 | 1 | 205.8 | 498.8 | 0.41 | 0.094 | 0.50 | 42.7 | 0.628 | 1.16 | 0.036 | 2.9 | 1.4 | 5.6 |
| Comp. Example 21 | Example 2 | 1 | 205.6 | 499.0 | 0.41 | 0.111 | 1.00 | 85.3 | 0.627 | 1.16 | 0.041 | 3.3 | 0.8 | 3.7 |

According to the invention, a magnetic recording medium having a magnetization stabilization superior to that of the conventional products even in the case of using a fine hexagonal ferrite and providing the good short wavelength output and C/N at the time of reproduction using an MR head can be provided.

What is claimed is:

1. A magnetic recording medium comprising: a support; a non-magnetic layer containing a non-magnetic powder and a binder; and a magnetic layer containing a ferromagnetic powder and a binder, in this order,
   wherein the magnetic layer contains a hexagonal ferrite magnetic powder having an average tabular diameter of 10 to 28 nm, and has a coercive force (Hc) of 135 to 400 kA/m, a ratio (Hc/Hk) of the Hc to an anisotropic magnetic field (Hk) of 0.3 to 0.6, and a maximum value of ΔM of 0 to 0.10.

2. The magnetic recording medium according to claim 1, wherein the magnetic layer has a thickness of 0.01 to 0.5 μm, and a product of a residual magnetic flux density and a magnetic layer thickness of 5 to 100 mT·μm.

3. The magnetic recording medium according to claim 1, wherein the non-magnetic powder is dispersed in the binder in the non-magnetic layer.

4. The magnetic recording medium according to claim 1, wherein the ferromagnetic powder is dispersed in the binder in the magnetic layer.

5. The magnetic recording medium according to claim 1, wherein the Hc is 150 to 350 kA/m.

6. The magnetic recording medium according to claim 1, wherein the Hc/Hk ratio is 0.35 to 0.6.

7. The magnetic recording medium according to claim 1, wherein the maximum value of ΔM is 0 to 0.09.

8. The magnetic recording medium according to claim 1, wherein the hexagonal ferrite magnetic powder has an average tabular diameter of 15 to 25 nm.

9. The magnetic recording medium according to claim 1, wherein the hexagonal ferrite magnetic powder has a tabular ratio of 1.5 to 4.0.

10. The magnetic recording medium according to claim 1, wherein the magnetic layer contains 200 to 800 parts by weight of the ferromagnetic powder and 100 parts by weight of the binder.

* * * * *